United States Patent
Kuruvila et al.

(10) Patent No.: US 10,339,076 B2
(45) Date of Patent: Jul. 2, 2019

(54) SYSTEM AND METHOD FOR ADAPTABLE FABRIC CONSISTENCY VALIDATION AND ISSUE MITIGATION IN AN INFORMATION HANDLING SYSTEM

(71) Applicant: Dell Products, LP, Round Rock, TX (US)

(72) Inventors: Binay A. Kuruvila, Cedar Park, TX (US); Sudhir Shetty, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 703 days.

(21) Appl. No.: 14/853,466

(22) Filed: Sep. 14, 2015

(65) Prior Publication Data

US 2017/0075833 A1     Mar. 16, 2017

(51) Int. Cl.
*G06F 3/00* (2006.01)
*G06F 13/20* (2006.01)
*G06F 13/10* (2006.01)
*G06F 13/40* (2006.01)

(52) U.S. Cl.
CPC ............ *G06F 13/20* (2013.01); *G06F 13/102* (2013.01); *G06F 13/4068* (2013.01)

(58) Field of Classification Search
CPC .... G06F 13/102; G06F 13/20; G06F 13/4068; H04L 67/1097
See application file for complete search history.

(56) References Cited

U.S. PATENT DOCUMENTS

| | | | |
|---|---|---|---|
| 4,545,848 A | 10/1985 | Lehoczy et al. | |
| 8,151,011 B2 | 4/2012 | Chiasson et al. | |
| 2008/0172480 A1* | 7/2008 | Agrawal | H04L 67/1097 709/221 |
| 2009/0240713 A1 | 9/2009 | Jia et al. | |
| 2012/0131353 A1 | 5/2012 | Nasir et al. | |

OTHER PUBLICATIONS

U.S. Appl. No. 14/696,249, filed Apr. 24, 2015.

\* cited by examiner

*Primary Examiner* — Idriss N Alrobaye
*Assistant Examiner* — Richard B Franklin
(74) *Attorney, Agent, or Firm* — Larson Newman, LLP

(57) ABSTRACT

A method performed by an information handling system, the method including detecting that a first device has been connected to the information handling system (IHS). The method further including in response to detecting that the first device has been connected, updating one or more fabric consistency validation rules of the IHS associated with the first device and one or more other devices that are connected to the first device by one or more links, and validating that the first device is compatible with each of the other devices based on the updated fabric consistency validation rules of the IHS.

19 Claims, 4 Drawing Sheets

| Fabric Consistency Validation Rules 230 |||
|---|---|---|
| I/O Adapter Rules 232 Server 10GE-KR Adapter |||
| Capabilities 252 | Interoperability 253 | Specs 254 |
| 10GE-KR | 10GE-KR 1GE-KX 1GE-Fixed Conflict 10GE-XAUI | |
| Fabric I/O Module Rules 234 1GE |||
| Capabilities 256 | Interoperability 257 | Specs 258 |
| 1GE | 10GE-KR 1GE-KX 1GE-Fixed 10GE-XAUI Conflict 10GE-KR Only Conflict 10GE-XAUI Only | |
| Platform Rules 236 |||
| Capabilities 262 | Interoperability 263 | Specs 264 |
| | Conflict 10GE-KR | |

*FIG. 2*

SYSTEM AND METHOD FOR ADAPTABLE FABRIC CONSISTENCY VALIDATION AND ISSUE MITIGATION IN AN INFORMATION HANDLING SYSTEM

FIELD OF THE DISCLOSURE

This disclosure generally relates to information handling systems, and more particularly relates to a system and method for adaptable fabric consistency validation and issue mitigation in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. An information handling system includes a wide variety of processing elements, devices, input output adapters, and fabric input output modules, that can be initially configured in the information handling system and/or dynamically added to the information handling system. An information handling system can include a controller that can perform a validation to determine that all of the processing elements, the devices, the input output adapters, and the fabric input output modules in the information handling system are consistent with each other. The controller can also perform a mitigation process to resolve any incompatibility issues that are found during the consistency validation.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 2 illustrates the fabric consistency validation rules of the information handling system of FIG. 1 in more detail;

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, the information handling system can include processing resources for executing machine-executable code, such as a Central Processing Unit (CPU), a Programmable Logic Array (PLA), an embedded device such as a System-On-a-Chip (SoC), or other control logic hardware. The information handling system can also include one or more computer-readable medium for storing machine-executable code, such as software or data. Additional components of the information handling system can include one or more storage devices that can store machine-executable code, one or more communications ports for communicating with external devices, and various Input and Output (I/O) devices, such as a keyboard, a mouse, and a video display.

Figure 1:
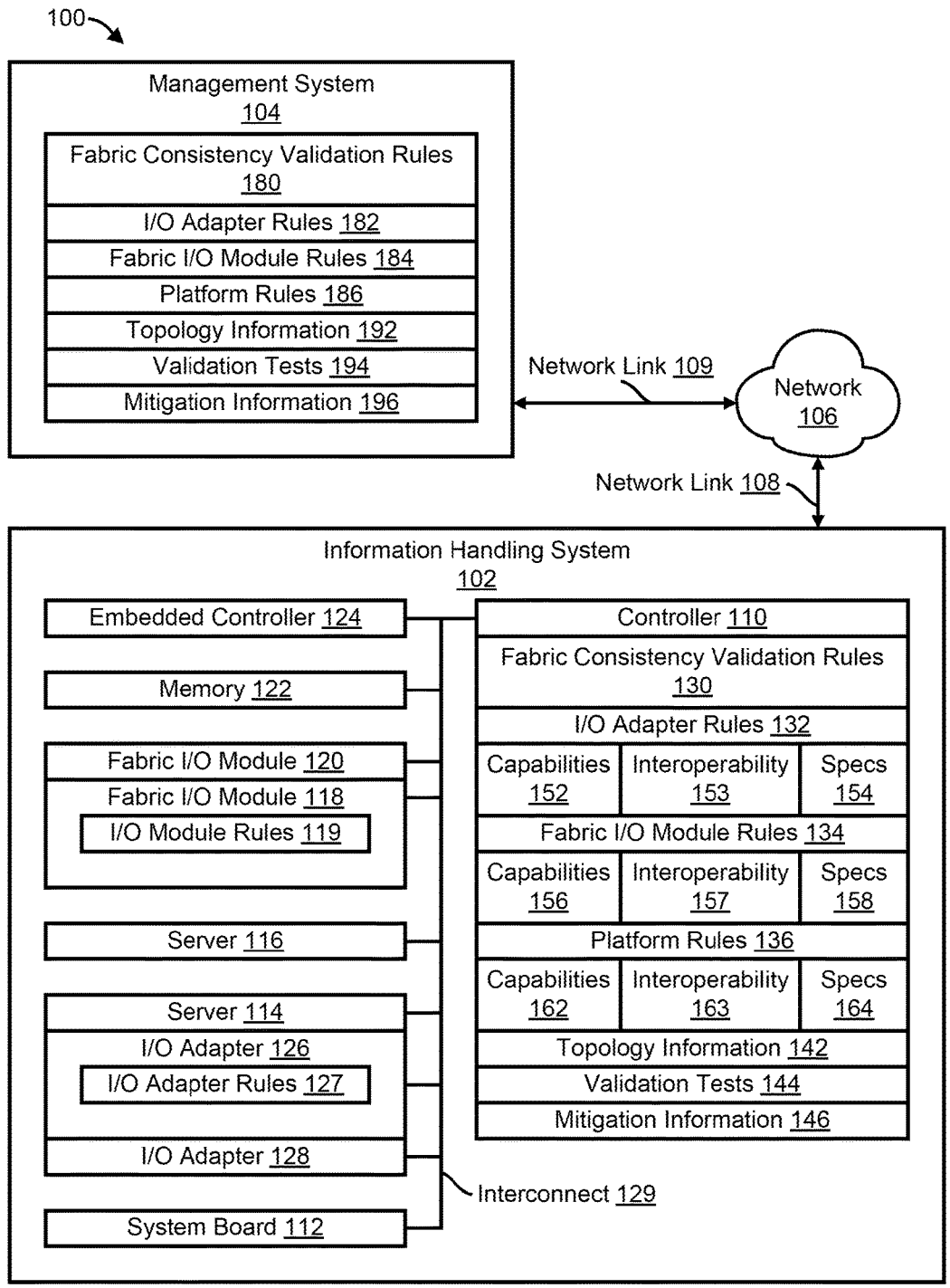
FIG. 1 is a block diagram illustrating a network system having an information handling system for adaptable fabric consistency validation and issue mitigation according to an embodiment of the present disclosure.
Figure 3:
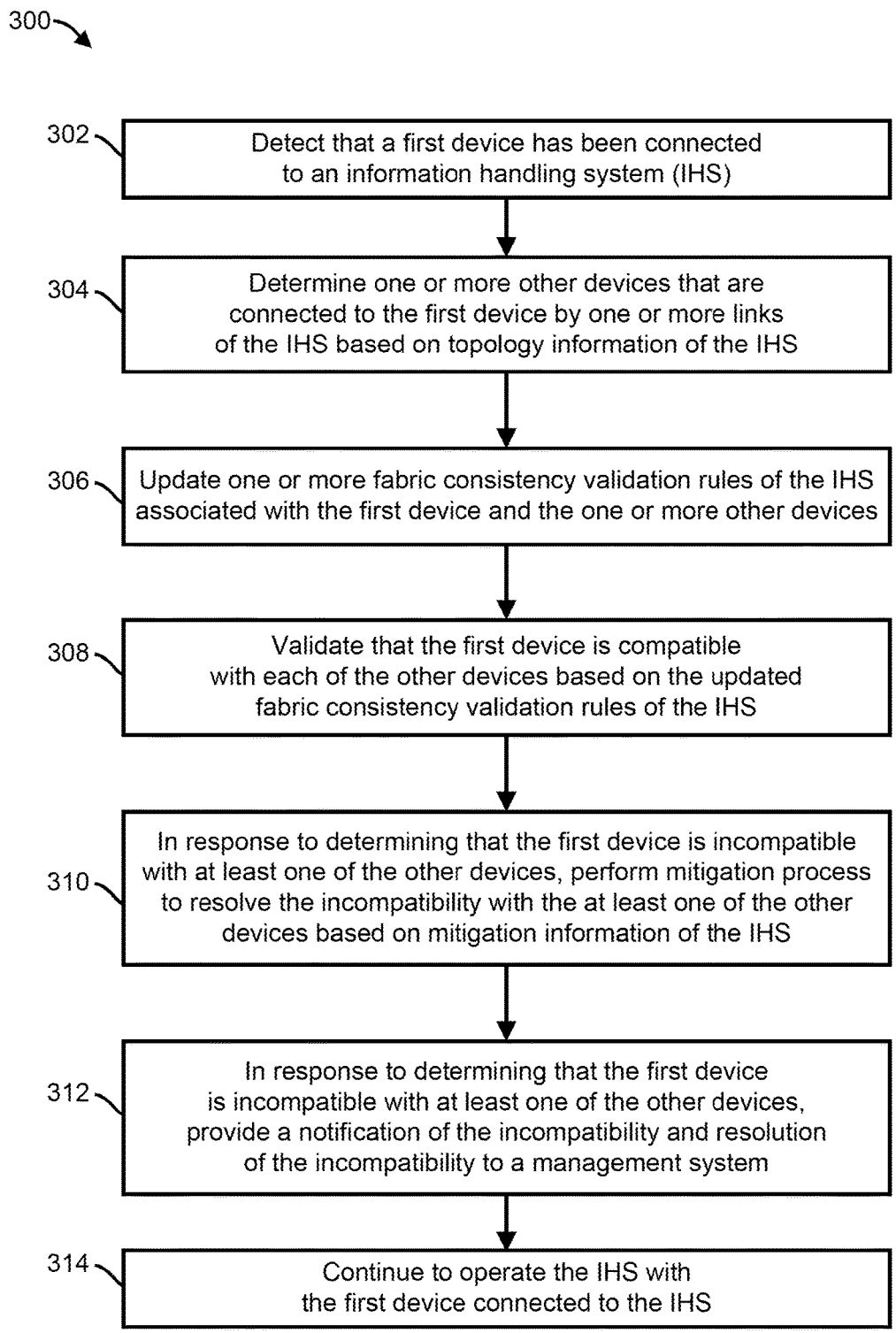
FIG. 3 illustrates a method for adaptable fabric consistency validation and issue mitigation in an information handling system according to an embodiment of the present disclosure.

FIGS. 1-3 illustrate a network system having an information handling system and a management system, and a method for adaptable fabric consistency validation and issue mitigation, according to an embodiment of the present disclosure.

FIG. 1 is a simplified diagram of a network system 100 that includes an information handling system (IHS) 102 and a management system 104 that communicate with each other via a network 106, where IHS 102 and management system 104 are connected to network 106 by network links 108 and 109, respectively. IHS 102 is operable to perform a fabric consistency validation of devices that are connected to IHS 102, and perform a mitigation process to resolve any incompatibilities and inconsistencies that are found by the fabric consistency validation of the devices to allow IHS 102 to continue operation at an optimal configuration. IHS 102 is further operable to maintain and update information associated with IHS 102 to ensure that the information is up to date and that the information incorporates any new knowledge learned during the performance of the fabric consistency validation of the devices, as described in further detail below. Management system 104 includes logic and control mechanisms that are configured to perform various operations in the performance of fabric consistency validation and issue mitigation, as described below. Management system 104 is operable to manage and maintain information associated with IHS 102 that facilitates IHS 102 in performing the fabric consistency validation and issue mitigation of IHS 102. Management system 104 is further operable to provide management functions for IHS 102, such as provide authorization for a particular issue mitigation process, and perform further actions based on notifications from IHS 102 that provide the results of a mitigation process and the operating state of IHS 102, described below in further detail. Other information handling systems, devices, modules, network systems, and networks can be appropriately connected to network 106 via other network links as needed or desired. Network 106 may be the internet, a local area network (LAN), a private network, and the like.

IHS 102 includes a controller 110, a system board 112, a server 114 having input output (I/O) adapters 126 and 128, a server 116, fabric I/O modules 118 and 120, a memory 122, and an embedded controller 124 that communicate with each other via an interconnect 129. Controller 110 includes fabric consistency validation rules 130 of IHS 102, topology information 142 of IHS 102, validation tests 144 of IHS 102, and mitigation information 146 of IHS 102. Controller 110 monitors the operating state of IHS 102, and each of the devices of IHS 102 via interconnect 129, where each of the devices include system board 112, servers 114 and 116, I/O adapters 126 and 128, and fabric I/O modules 118 and 120. Controller 110 performs the fabric consistency validation and issue mitigation of the devices of IHS 102 based on fabric consistency validation rules 130, topology information 142, validation tests 144, mitigation information 146, and the operating states of IHS 102 and each of the devices of IHS 102, described in further detail below.

Fabric consistency validation rules 130 includes information about the capabilities and characteristics of each of the devices and of IHS 102, also referred to as the platform, interoperability of each of the devices and the platform with each other (e.g. what fabrics/fabric types and devices are compatible and/or incompatible with each other), special attributes of each of the devices and the platform, any per-conditions that need to be met prior to performing the fabric consistency validation, policies and limitations associated with fabric consistency validation rules 130, and operating state characteristics associated with each of the devices and the platform. The fabric consistency validation rules 130 may have attributes corresponding to tags that represent the capabilities and characteristics of the devices and the platform, and tags that represent an interoperability matrix which may be expressed as a combination of white lists (e.g. interoperability and tag types) and black lists (e.g. conflict tags). The tags may also be expressed as regular expressions to enable a family of interoperability combinations. Controller 110 utilizes, maintains, and updates the information in fabric consistency validation rules 130.

Fabric consistency validation rules 130 includes one or more I/O adapter rules 132 for each one of the I/O adapters in IHS 102, one or more fabric I/O module rules 134 for each one of the fabric I/O modules in IHS 102, and platform rules 136 for the platform, IHS 102. I/O adapter rules 132 has similar information and structure as fabric consistency validation rules 130, previously described, and includes capabilities 152, interoperability 153, and special attributes 154 of its associated I/O adapter. Fabric I/O module rules 134 has similar information and structure as I/O adapter rules 132, and includes capabilities 156, interoperability 157, and special attributes 158 of its associated fabric I/O module. Fabric I/O module rules 134 represent the interoperability rules of the fabric I/O modules of IHS 102 with the I/O adapters of IHS 102. Platform rules 136 has similar information and structure as fabric I/O module rules 134, and includes capabilities 162, interoperability 163, and special attributes 164 of the platform, IHS 102. Platform rules 136 express an overlay of platform specific, IHS 102 specific, policies and limitations on I/O adapter rules 132 and fabric I/O module rules 134.

System board 112 has one or more slots that allow one or more servers to be connected to IHS 102 by connecting a server to one of the one or more slots of system board 112 (e.g. plugging the server in to one of the slots). System board 112 may allow the server to be connected to one of the slots when system board 112 is in a power off state or may allow the server to be connected to one of the slots when system board 112 and IHS 102 is in a power on operating state (e.g. hot-plugging the server in to the slot). Servers 114 and 116 may be a standard server, a blade server, a hyper-scale server, and the like. Servers 114 and 116 have similar structure and provide similar functionality, and each one of servers 114 and 116 may have one or more I/O adapters connected to it via one or more ports of each one of servers 114 and 116, such as adapters 126 and 128 connected to server 114 as depicted in FIG. 1.

I/O adapters 126 and 128 may have one or more ports that allow the attachment of an fabric I/O module to one of the one or more ports. I/O adapters 126 and 128 may be a Network Interface Card (NIC) adapter, a Converged Network Adapter (CNA), a Host Bus Adapter (HBA), a Versa Module Europa bus (VMEbus) card adapter, a Peripheral Component Interface (PCI) card adapter, a Compact Peripheral Component Interface (PCI) card adapter, a Peripheral Component Interface Express (PCIe) adapter, and the like. I/O adapters 126 and 128 have similar structure and provide similar functionality, and may be self describing hardware that provides accessible meta-data that describe I/O adapter rules for the I/O adapter, such as I/O adapter 126 having I/O adapter rules 127. I/O adapter rules 127 has similar information as I/O adapter rules 132, previously described, and includes capabilities, interoperability, and special attributes information of its associated I/O adapter 126.

Fabric I/O modules 118 and 120 may have one or more ports and may be an Ethernet module having an Ethernet fabric type, a Fibre Channel module having a Fibre Channel fabric type, an Infiniband module having an Infiniband fabric type, a Versa Module Europa bus (VMEbus) module having a VMEbus fabric type, a Peripheral Component Interface (PCI) module having a PCI fabric type, a Peripheral Component Interface Express (PCIe) module having a PCIe fabric type, a switch module having a having an Ethernet, a Fibre Channel, or a Infiniband fabric type, and the like. Fabric I/O modules 118 and 120 have similar structure and provide similar functionality, and may be self describing hardware that provides accessible meta-data that describe fabric I/O module rules for the fabric I/O module, such as fabric I/O module 118 having fabric I/O module rules 119. Fabric I/O module rules 119 has similar information as fabric I/O module rules 134, previously described, and includes capabilities, interoperability, and special attributes information of its associated fabric I/O module 118.

Memory 122 may include code for performing various operations, functions, and methods of IHS 102. Embedded controller 124 is operable to perform various functions in the operation and management of IHS 102, such as the management of firmware and software updates of IHS 102.

Management system 104 includes fabric consistency validation rules 180, topology information 192, validation tests 194, and mitigation information 196, where fabric consistency validation rules 180, topology information 192, validation tests 194, and mitigation information 196 have similar structure and information as fabric consistency validation rules 130, topology information 142, validation tests 144, and mitigation information 146 of IHS 102, respectively, as previously described. Fabric consistency validation rules 180 includes one or more I/O adapter rules 182, one or more fabric I/O module rules 184, and platform rules 186, where I/O adapter rules 182, fabric I/O module rules 184, and platform rules 186 have similar information and structure, and are associated with the same device of IHS 102, as I/O adapter rules 132, fabric I/O module rules 134, platform rules 136, respectively, as described above.

Management system 104 is operable to manage, maintain, and update fabric consistency validation rules 180, topology information 192, validation tests 194, and mitigation information 196 associated with IHS 102. Management system 104 is further operable to provide information to IHS 102 including fabric consistency validation rules 180, topology information 192, validation tests 194, and mitigation information 196 associated with IHS 102, and receive information from IHS 102 to manage and update fabric consistency validation rules 180, topology information 192, validation tests 194, and mitigation information 196 associated with IHS 102 with the information from IHS 102. Management system 104 may also update fabric consistency validation rules 180, topology information 192, validation tests 194, and mitigation information 196 associated with IHS 102 through an administration function provided by management system 104. For example, management system 104 may update fabric consistency validation rules 180 with a new fabric type that is introduced in the market after IHS 102 is in operation to allow IHS 102 to be forward compatible with new I/O adapters and fiber I/O modules of the new fabric type and be operational with the new I/O adapters and fiber I/O modules in IHS 102 compatible modes. Management system 104 may update fabric consistency validation rules 180, validation tests 194, and mitigation information 196 associated with IHS 102 in a similar manner, to incorporate knowledge and learning from other IHSs and sources, such as learned interoperability issues between specific I/O adapters and fabric I/O modules, improved validation tests, and more comprehensive and optimal mitigation information and plans.

IHS 102 is operable to perform the fabric consistency validation of the devices that are connected to IHS 102 and the mitigation process to resolve any incompatibilities and inconsistencies during initial power up, configuration, and initialization of IHS 102. IHS 102 is further operable to perform the fabric consistency validation and the mitigation process during operation of IHS 102.

Controller 110 operates to detect that a first device, such as fabric I/O module 118, has been connected to IHS 102, such as fabric I/O module 118 having been connected to I/O adapter 126 of IHS 102. Controller 110 may detect that fabric I/O module 118 has been connected to I/O adapter 126 of IHS 102 via a port of I/O adapter 126 by a signal indicating that fabric I/O module 118 has been connected to a port of I/O adapter 126, receiving a connection message from fabric I/O module 118, detecting a power event that indicates that fabric I/O module 118 has been connected to I/O adapter 126 via a port of I/O adapter 126, and the like.

Controller 110 may also detect that fabric I/O module 118 has been connected to I/O adapter 126 by detecting that firmware and/or software associated with fabric I/O module 118 has been updated, and in response, detect that fabric I/O module 118 has been connected to I/O adapter 126. For example, updated firmware and/or software may be downloaded and installed for fabric I/O module 118. Upon re-initiation of fabric I/O module 118 over a sideband interface, controller 118 is notified that the firmware and/or software associated with fabric I/O module 118 has been updated and a new fabric I/O module rule exists. In response to the notification, while IHS 102 is in operation, controller 110 detects that fabric I/O module 118 has been connected so that controller 110 can validate that IHS 102 is still consistent, compatible, and optimized after the firmware and/or software update, as described in detail below.

Controller 110 further operates to determine one or more other devices, such as I/O adapter 126, that are connected to the first device via a port of the first device, fabric I/O module 118, by one or more links of IHS 102 based on topology information of IHS 102, such as topology information 142. Controller 110 may determine topology information 142 based on a discovery process performed at initial IHS 102 configuration and bring-up and updated when any device is added or removed from IHS 102 during operation. Topology information 142 may also have been created, updated, and maintained by administration functions of IHS 102. Controller 110 may topology information 142 to management system 104 to allow topology information 192 to be updated with the latest level of information. Topology information 192 may also be received from management system 104 and used by controller 110 to update topology information 142 of IHS 102, where topology information 192 has been created, updated, and maintained by administration functions of management system 104.

Controller 110 further operates to update one or more fabric consistency validation rules of IHS 102, such as fabric consistency validation rules 130, associated with the first device, fabric I/O module 118, and the one or more other devices, I/O adapter 126, that are connected to the first device via the one or more links. In an embodiment, controller 110 may acquire fabric I/O module rules 119 from fabric I/O module 118 to add fabric I/O module rules 119 associated with fabric I/O module 118 to fabric I/O module rules 134 of fabric consistency validation rules 130, as fabric I/O module 118 has self describing hardware and/or software capabilities. Similarly, controller 110 may acquire I/O adapter rules 127 from I/O adapter 126 to add I/O adapter rules 127 associated with I/O adapter 126 to I/O adapter rules 132 of fabric consistency validation rules 130, as I/O adapter 126 has self describing hardware and/or software capabilities. Controller 110 may also acquire platform rules 136 for the platform, IHS 102, from the platform. In another embodiment, when the fabric I/O module, the I/O adapter, and the platform do not have self describing hardware and/or software capabilities, controller 110 may retrieve fabric I/O module rules 184 associated with fabric I/O module 118, I/O adapter rules 182 associated with I/O adapter 126, and platform rules 186 associated with the platform, IHS 102, from management system 104 to add fabric I/O module rules 184 associated with fabric I/O module 118, I/O adapter rules 182 associated with I/O adapter 126, and platform rules 186 associated with the platform to fabric I/O module rules 134, I/O adapter rules 132, and platform rules 136 of fabric consistency validation rules 130, respectively.

Controller 110 further operates to validate that the first device, fabric I/O module 118, is compatible with each of the one or more other devices, I/O adapter 126, based on the updated fabric consistency validation rules of HIS 102, updated fabric consistency validation rules 130. The updated fabric consistency validation rules 130 includes the latest/updated capabilities, interoperability, and special attributes information for fabric I/O module 118, I/O adapter 126, and the platform that controller 110 utilizes to perform the validation, such as fabric consistency validation rules 230, described in detail below with respect to FIG. 2. Controller 110 may validate that the first device, fabric I/O module 118, is compatible with each of the one or more other devices, I/O adapter 126, by determining that the fabric type of the first device, fabric I/O module 118, such as Ethernet, is compatible with the fabric type of each of the one or more other devices, I/O adapter 126, for example Ethernet, where the fabric type of the first device is described in capabilities 156 of fabric I/O module rules 134 for fabric I/O module 118 and the fabric type of each of the one or more other devices, I/O adapter 126, is described in capabilities 152 of I/O adapter rules 132 for I/O adapter 126. Controller 110 further determines whether fabric I/O module 118 is interoperable with I/O adapter 126 by matching at least one mode of interoperability 157 of fabric I/O module rules 134 for fabric I/O module 118 to at least one mode of interoperability 153 of I/O adapter rules 132 for I/O adapter 126. Controller 110 also determines that fabric I/O module 118 has consistent special attributes 158 of fabric I/O module rules 134 for fabric I/O module 118 with special attributes 154 of I/O adapter rules 132 for I/O adapter 126. In response to matching at least one mode of interoperability and having consistent special attributes, controller 110 further determines that the capabilities 162 of platform rules 136 are compatible with the capabilities of fabric I/O module 118 and I/O adapter 126, that the interoperability 163 of platform rules 136 supports (e.g. does not have any conflicts) the at least one more of the interoperability modes of fabric I/O module 118 and I/O adapter 126, and that the special attributes 164 of platform rules 136 are consistent with special attributes 158 of fabric I/O module rules 134 for fabric I/O module 118 and special attributes 154 of I/O adapter rules 132 for I/O adapter 126.

As part of the validation process, controller 110 may also retrieve validation tests 194 of IHS 102 from management system 104 to update validation tests 144 of IHS 102 to ensure that they are at the latest level. Controller 110 may utilize validation tests 144 to further validate that the first device, fabric I/O module 118, is compatible with each of the one or more other devices, I/O adapter 126, and to validate that fabric consistency validation rules 130 themselves are valid. For example, fabric consistency validation rules 130 indicate that fabric I/O module 118 and I/O adapter 126 fully support the Ethernet standard and are interoperable at 10 Gb/second. However, performing validation tests 144 may show that packets are dropped while communicating between the devices at 10 Gb/s, but communicate without any errors at 1 Gb/s. As another example, fabric consistency validation rules 130 indicate that fabric I/O module 118 fully supports 10 Gbe and the Ethernet standard and that I/O adapter 126 supports both 1 Gb Ethernet Auto and 1 Gb Fixed modes of operation and is interoperability with a 10 Gbe fabric I/O module. Performing validation tests 144 may show that I/O adapter 126 may auto-negotiate with fabric I/O module 118 in 1 Gb Ethernet Auto mode of operation but fails to auto-negotiate with fabric I/O module 118 in the 1 Gb Ethernet Fixed mode of operation. Controller 110 may update fabric consistency validation rules 130 based on the results of performing validation tests 144 during validation that the first device, fabric I/O module 118, is compatible with each of the one or more other devices, I/O adapter 126, including where any one of fabric consistency validation rules 130 are shown to be invalid. Controller 110 may further provide fabric consistency validation rules 130 to management system 104 to allow fabric consistency validation rules 180 to be updated with the latest level of information.

In response to determining that the first device, fabric I/O module 118, is incompatible with at least one of the one or more other devices, I/O adapter 126, controller 110 further operates to perform a mitigation process to resolve the incompatibility with the at least one of the one or more other devices, I/O adapter 126, based on mitigation information of the IHS 102, such as mitigation information 146. Controller 110 may retrieve mitigation information 196 of IHS 102 from management system 104 to update mitigation information 146 of IHS 102 to ensure that the information is at the latest level. Controller 110 may also monitor the operating state of IHS 102, and each of the devices of IHS 102, fabric I/O module 118 and I/O adapter 126, to utilize the operating state information in the mitigation process. For example, controller 110 may have determined that fabric I/O module 118 requires 50 watts of power to be interoperable with I/O adapter 126 but that I/O adapter 126 is only able to supply 25 watts of power based on the current operating state of the port of I/O adapter 126 that fabric I/O module 118 is connected to. However, the neighbor port of I/O adapter 126 is unoccupied and can also supply 25 watts of power. Controller 110 may re-direct and re-configure the power of the neighbor port to the port of I/O adapter 126 that fabric I/O module 118 is connected to, such that 50 watts of power is delivered to fabric I/O module 118, resolving the incompatibility issue.

As another example, controller 110 may have determined that fabric I/O module 118 correctly links with I/O adapter 126 at 10 Gb/s but suffers from packet drops. Mitigation information 146 may indicate that the packet drops issue may be resolved with an upgraded level of firmware. Mitigation information 146 may also indicate that fabric I/O module 118 will be interoperable with I/O adapter 126 at a lower rate of 1 Gb/s which will allow IHS 102 to continue operation at the lower rate to resolve the immediate incompatibility issue while a longer term solution that allows correct operation at the full capability is found. Mitigation information 146 also includes policy, priority, and authorization information that controller 110 utilizes to determine which of the mitigation plans to perform to resolve the incompatibility issue.

In yet another example, controller 110 may have determined that fabric I/O module 118 has been linked to I/O adapter 126 at 1 Gb/s but is 10 Gb/s capable. As such, controller 110 may automatically change the operating mode of fabric I/O module 118 to 10 Gb/s to bring it up to its full 10 Gb/s capability to mitigate the non-optimal issue. In a further example, controller 110 may mitigate an incompatibility issue by utilizing redundant hardware and/or devices to resolve the issue and informing management system 104 that redundant hardware and/or devices were used to address the issue so that the issues found with the non-functioning hardware and/or devices can be resolved and system redundancy of IHS 102 restored. Controller 110 may update mitigation information 146 with the results of the mitigation plans to ensure that mitigation information 146 has the latest level of information. Controller 110 may further provide mitigation information 146 to management system 104 to allow mitigation information 196 to be updated with the latest level of information.

In response to determining that the first device, fabric I/O module 118, is incompatible with at least one of the one or more other devices, I/O adapter 126, controller 110 further operates to provide a notification of the incompatibility and resolution of the incompatibility to a management system, such as management system 104, for further action.

Controller 110 further operates to continue to operate IHS 102 with the first device, fabric I/O module 118, connected to IHS 102.

In this manner, controller 110 isolates incompatibility issues down to a link level of a device (e.g. a specific port of an I/O adapter, a specific slot of a system board, a specific port of a server), and automatically resolves the incompatibility issues with minimal or no system operation impact. The fabric consistency validation rules and information utilized for validation and issue mitigation is updated with the latest information, incorporates all the intelligence and knowledge learned over time about the IHS, and allows for backward and forward compatibility of hardware automatically and during system operation. Manual entry of data is not required and firmware updates are not required to update the rules and/or information, resulting in reduced errors while optimizing system performance and up time.

FIG. 2 illustrates exemplary fabric consistency validation rules utilized for validation and issue mitigation in information handling system 102 of FIG. 1, including fabric consistency validation rules 230. Fabric consistency validation rules 230 has similar structure and information as fabric consistency validation rules 130 of FIG. 1 and includes I/O adapter rules 232 for a server 10GE-KR adapter, fabric I/O module rules 234 for a 1 G Ethernet, and platform rules 236. I/O adapter rules 232 includes capabilities 252, interoperability 253, and special attributes 254, where capabilities 252 includes "10GE-KR", interoperability 253 includes "10GE-KR", "1GE-KX", "1GE-Fixed", and "Conflict 10GE-XAUI", and special attributes 254 has a Null entry. Fabric I/O module rules 234 includes capabilities 256, interoperability 257, and special attributes 258, where capabilities 256 includes "1GE", interoperability 257 includes "10GE-KR", "1 GE-KX", "1GE-Fixed", "10GE-XAUI", "Conflict 10GE-KR Only", and "Conflict 10GE-XAUI Only", and special attributes 254 has a Null entry. Platform Rules 236 includes capabilities 262, interoperability 263, and special attributes 264, where capabilities 262 has a Null entry, interoperability 263 includes "Conflict 10GE-KR", and special attributes 264 has a Null entry.

Controller 110 operates to validate that the server 10GE-KR adapter is compatible with the 1 G Ethernet I/O module based on the updated fabric consistency validation rules 230. Controller 110 determines that the fabric type of the server 10GE-KR adapter, which is Ethernet based on capabilities 252 having a value of "10GE-KR", is compatible with the fabric type of the 1 G Ethernet I/O module, which is Ethernet based on capabilities 256 having a value of "1GE". Controller 110 further determines that the server 10GE-KR adapter is interoperable with the 1 G Ethernet I/O module based on interoperability 253 having values of "1GE-KX" and "1GE-Fixed" that match the values "1GE-KX" and "1GE-Fixed" of interoperability 257. The server 10GE-KR adapter is not operable for a link with a XAUI I/O module as indicated by the value "10GE-XAUI" of interoperability 253. The 1 G Ethernet I/O module is also not operable with a link to an I/O adapter operating at 10 Gb/s in KR and XAUI modes as indicated by the values "10GE-KR" and "10GE-XAUI" of interoperability 257. The platform, IHS 102, signal integrity has not been validated at 10 Gb/second link rates as indicated by the value "Conflict 10GE-KR" of interoperability 263. Controller 110 resolves the incompatibility issue between the server 10GE-KR adapter and the platform by allowing the 1 G Ethernet I/O module and the server 10GE-KR adapter to operate in the 1GE-KX mode, where the 1GE-KX mode of operation has been prioritized higher than the 1GE-Fixed mode of operation in I/O adapter rules 232 and fabric I/O module rules 234.

FIG. 3 illustrates a method for adaptable fabric consistency validation and issue mitigation in information handling system 102 of FIG. 1, where the exemplary method 300 begins at block 302. At block 302, controller 110 of IHS 102 detects that a first device, such as fabric I/O module 118, has been connected to IHS 102, such as fabric I/O module 118 having been connected to I/O adapter 126 of IHS 102. At block 304, controller 110 determines one or more other devices, such as I/O adapter 126, that are connected to the first device, fabric I/O module 118, by one or more links of IHS 102 based on topology information of IHS 102, such as topology information 142.

At block 306, controller 110 updates one or more fabric consistency validation rules of IHS 102, such as fabric consistency validation rules 130, associated with the first device, fabric I/O module 118, and the one or more other devices, I/O adapter 126, that are connected to the first device via the one or more links. At block 308, controller 110 validates that the first device, fabric I/O module 118, is compatible with each of the one or more other devices, I/O adapter 126, based on the updated fabric consistency validation rules of HIS 102, updated fabric consistency validation rules 130.

At block 310, in response to determining that the first device, fabric I/O module 118, is incompatible with at least one of the one or more other devices, I/O adapter 126, controller 110 performs a mitigation process to resolve the incompatibility with the at least one of the one or more other devices, I/O adapter 126, based on mitigation information of the IHS 102, such as mitigation information 146. At block 312, in response to determining that the first device, fabric I/O module 118, is incompatible with at least one of the one or more other devices, I/O adapter 126, controller 110 provides a notification of the incompatibility and resolution of the incompatibility to a management system, such as management system 104, for further action. At block 314, controller 110 continues to operate IHS 102 with the first device, fabric I/O module 118, connected to IHS 102.

Figure 4:
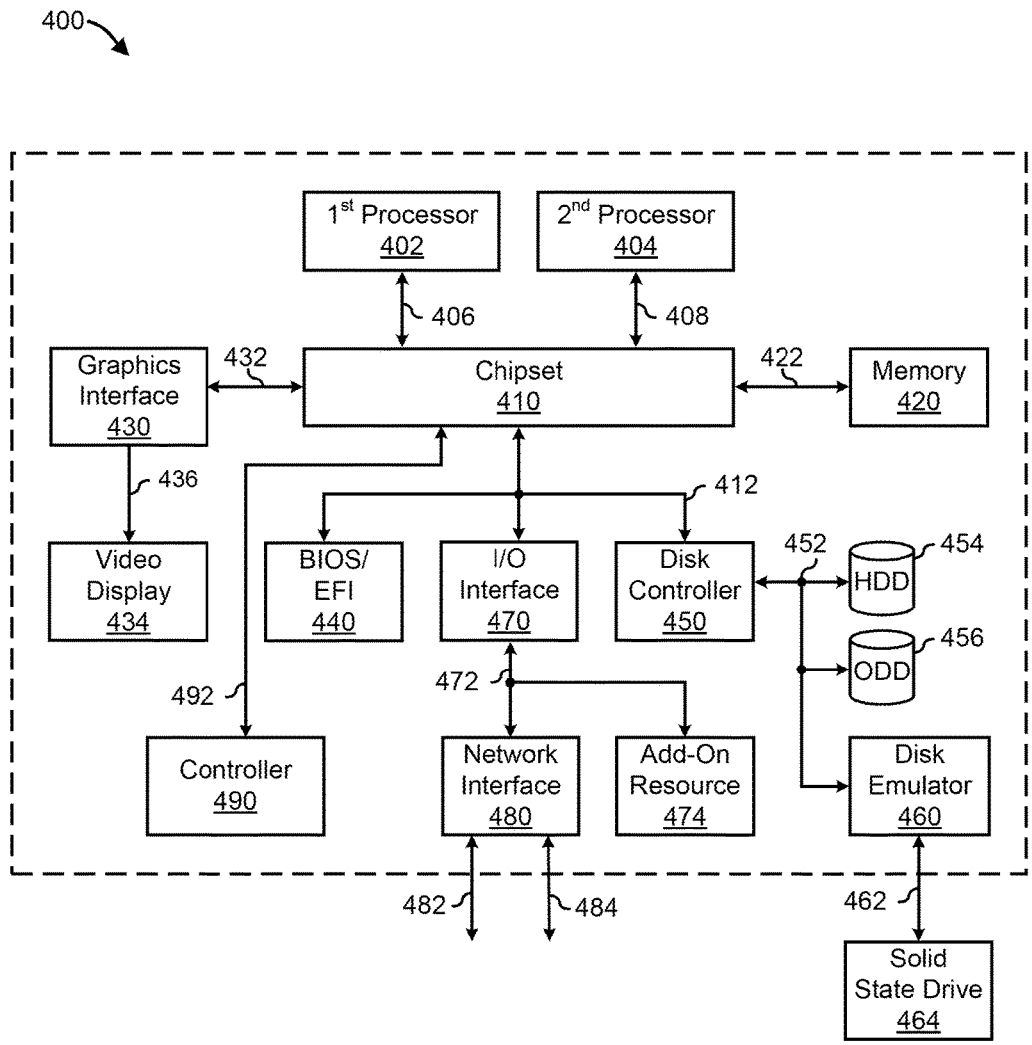
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a Central Processing Unit (CPU), a Programmable Logic Array (PLA), an embedded device such as a System-On-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various Input and Output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes processors 402 and 404, a chipset 410, a memory 420, a graphics interface 430, include a Basic Input Output System/Extensible Firmware Interface (BIOS/EFI) module 440, a disk controller 450, a disk emulator 460, an Input/Output (I/O) interface 470, a network interface 480, and a controller 490. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes Random Access Memory (RAM) such as Static RAM (SRAM), Dynamic RAM (DRAM), Non-Volatile RAM (NV-RAM), or the like, Read Only Memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a Hard Disk Drive (HDD) 454, to an Optical Disk Drive (ODD) 456, and to disk emulator 460. An example of disk interface 452 includes an Integrated Drive Electronics (IDE) interface, an Advanced Technology Attachment (ATA) such as a Parallel ATA (PATA) interface or a Serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474 and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a Network Interface Card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Controller 490 is connected to chipset 410 via a controller interface 492, and operates to perform fabric consistency validation and issue mitigation of information handling system 400.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method performed by an information handling system (IHS), the method comprising:
   receiving fabric consistency validation rules for the IHS;
   detecting that a first device has been connected to the IHS in response to detecting that software associated with the first device has been updated;
   in response to detecting that the first device has been connected, updating one of the fabric consistency validation rules associated with the first device or with one or more other devices that are connected to the first device by one or more links; and
   validating that the first device is compatible with each of the other devices based on the updated fabric consistency validation rules of the IHS.

2. The method of claim 1, further comprising:
   in further response to detecting that the first device has been connected:
      determining the other devices that are connected to the first device by the links based on topology information of the IHS prior to updating the fabric consistency validation rules of the IHS.

3. The method of claim 1, further comprising:
   in response to determining that the first device is incompatible with at least one of the other devices:
      performing a mitigation process to resolve the incompatibility with the other devices based on mitigation information of the IHS and an operating state of the IHS.

4. The method of claim 1, further comprising:
   in response to determining that the first device is incompatible with at least one of the other devices:
      providing a notification of the incompatibility and results of a mitigation process to resolve the incompatibility based on mitigation information of the IHS to a management system.

5. The method of claim 1, wherein the first device is an input output (I/O) adapter, a fabric I/O module, a server, and a system board.

6. The method of claim 1, wherein the other devices are an I/O adapter, a fabric I/O module, a server, and a system board.

7. The method of claim 1, wherein the links are physical connections between the first device and the other devices.

8. The method of claim 1, wherein the fabric consistency validation rules of the IHS associated with the first device and the other devices comprises:
   I/O adapter rules associated with the first device;
   a specific set of fabric I/O module rules associated with each one of the other devices; and
   platform rules of the IHS.

9. The method of claim 1, wherein updating the fabric consistency validation rules of the IHS associated with the first device and the other devices further comprises acquiring:
   I/O adapter rules from the first device;
   a specific set of fabric I/O module rules from each one of the other devices; and
   platform rules from the IHS.

10. The method of claim 1, wherein updating the fabric consistency validation rules of the IHS associated with the first device and the other devices further comprises:
    acquiring I/O adapter rules associated with the first device, a specific set of fabric I/O module rules associated with each one of the other devices, and platform rules of the IHS from a management system.

11. The method of claim 1, further comprising:
    in response to determining that the first device is incompatible with at least one of the other devices:
       isolating the incompatibility to each specific interoperability of the first device with each specific other device of the at least one of the other devices based on I/O adapter rules of the updated fabric consistency validation rules of the first device, fabric I/O module rules of the updated fabric consistency validation rules of the specific other device, platform rules of the updated fabric consistency validation rules of the IHS, and topology information of the IHS.

12. An information handling system (IHS), comprising:
    a first device;
    one or more other devices that are connected to the first device by one or more links; and
    a controller having fabric consistency validation rules of the IHS, the controller configured to:
       detect that the first device has been connected to the IHS in response to detecting that software associated with the first device has been updated;
       in response to the detecting that the first device has been connected to the IHS:
          update one of the fabric consistency validation rules associated with the first device or with the other devices that are connected to the first device by the links; and
       validate that the first device is compatible with each of the other devices based on the updated fabric consistency validation rules of the IHS.

13. The information handling system of claim 12, the controller further configured to:
    in further response to the detect that the first device has been connected to the IHS:
       determine the other devices that are connected to the first device by the links based on topology information of the IHS prior to the update the fabric consistency validation rules of the IHS.

14. The information handling system of claim 12, the controller further configured to:
    in response to the determine that the first device is incompatible with the at least one of the other devices:
       perform a mitigation process to resolve the incompatibility with the at least one of the other devices based on mitigation information of the IHS and an operating state of the IHS.

15. The information handling system of claim 12, wherein the first device is an I/O adapter, a fabric I/O module, a server, and a system board, and each one of the other devices is an I/O adapter, a fabric I/O module, a server, and a system board.

16. The information handling system of claim 12, wherein the fabric consistency validation rules of the IHS associated with the first device and the other devices comprises:
    I/O adapter rules associated with the first device;
    a specific set of fabric I/O module rules associated with each one of the other devices; and
    platform rules of the IHS.

17. The information handling system of claim 12, the controller further configured to:
    acquire I/O adapter rules from the first device, a specific set of fabric I/O module rules from each one of the other devices, and platform rules from the IHS; and
    update the fabric consistency validation rules of the IHS associated with the first device and the other devices.

18. A non-transitory computer-readable medium including code for performing a method by an IHS, the method comprising:
   receiving fabric consistency validation rules for the IHS;
   detecting that a first device has been connected to the IHS in response to detecting that software associated with the first device has been updated;
   in response to detecting that the first device has been connected, updating one of the fabric consistency validation rules associated with the first device or with one or more other devices that are connected to the first device by one or more links; and
   validating that the first device is compatible with each of the other devices based on the updated fabric consistency validation rules of the IHS.

19. The computer-readable medium of claim 18, further comprising:
   in response to determining that the first device is incompatible with at least one of the other devices; and
   performing a mitigation process to resolve the incompatibility with the at least one of the other devices based on mitigation information of the IHS and an operating state of the IHS.

* * * * *